Patented Nov. 6, 1934

1,979,516

UNITED STATES PATENT OFFICE 1,979,516

MANUFACTURE OF ORGANIC ESTERS

William S. Wilson, Brookline, Mass., assignor to Merrimac Chemical Company, Everett, Mass., a corporation of Massachusetts No Drawing. Application June 9, 1934, Serial No. 729,910

4 Claims. (Cl. 260—106)

This invention relates to the manufacture of alkyl esters of carboxylic acids and it has particular application to the manufacture of such esters wherein the acid is employed in the form of a metal salt, such as calcium acetate, and the alcohol is supplied as an ester of sulfuric acid. Alternatively, the acid may be added in the form of the free organic acid, such as acetic acid.

The present application is a continuation-in-part of my copending application, Serial No. 706,251, filed January 11, 1934, entitled "Manufacture of organic esters."

It has been proposed heretofore to manufacture alkyl esters of carboxylic acids, such as the alkyl acetates, by reacting an alkyl hydrogen sulfate with calcium acetate while avoiding the use of substantial amounts of water whereby the esterification is said to be facilitated. While it is true that alkyl sulfates react with calcium acetate to form alkyl acetates and calcium sulfate, the yield is far from quantitative and under some conditions, as when the ethyl sulfate is largely of the dialkyl species, is negligible.

Similarly when acetic acid is mixed with diethyl sulfate, little or no alkyl acetate is formed even after prolonged boiling.

I have now found that it is practicable to produce esters, such as ethyl acetate from ethyl sulfates which may contain large quantities of diethyl sulfate, in practically quantitative yields and at a rate which is substantially equivalent to that obtained in present day processes wherein free ethyl alcohol is employed, if the reaction is effected in the presence of substantial amounts of water and under conditions whereby there is present at all times an excess of either free sulfuric acid or alkyl hydrogen sulfate. Thus, in the case of ethyl acetate which is obtained from diethyl sulfate and calcium acetate, I proceed by first hydrolyzing the diethyl sulfate to ethyl alcohol, sulfuric acid, and varying quantities of ethyl sulfuric acid, after which calcium acetate is added, care being exercised to avoid the conversion of all of the sulfate radical present to calcium sulfate or calcium ethyl sulfate. When the free acetic acid is employed as the source of the acetate ion, it is added to the hydrolyzed mixture in the same manner as the calcium acetate is added to the hydrolyzed mixture. If desired, one may also add additional quantities of free alcohol as is more fully described hereinafter.

Diethyl sulfate is obtained conveniently by causing ethylene to combine with concentrated sulfuric acid. Depending upon the conditions of the reaction, including the pressure of ethylene, the concentration of the sulfuric acid, as well as the temperature of the reacting mixture, one obtains an equilibrium mixture of diethyl sulfate, ethyl sulfuric acid and free sulfuric acid. A typical example of one such mixture contains 50%–55% or more of diethyl sulfate, 30%–40% ethyl sulfuric acid and the remainder free sulfuric acid. Such a mixture, is perfectly stable and suffers no decomposition in storage. If acetic acid (in the form of calcium acetate) be added to this mixture in an amount which is the mol equivalent of the ethyl ($C_2H_5$) group present, little, if any, esterification results even after prolonged boiling and in the presence of an excess of water. I have found, however, that practically quantitative yields are obtainable if the original mixture, which is obtained by diluting the sulfated ethylene with water, is first hydrolyzed as by boiling, preferably under vigorously agitated conditions, whereby the insoluble diethyl sulfate is converted to ethyl alcohol and ethyl sulfuric acid. Part of the ethyl sulfuric acid which is present will simultaneously be converted to free sulfuric acid and ethyl alcohol. After the decomposition of the diethyl sulfate is complete, which can readily be established by the fact that the mixture loses its cloudy appearance and becomes clear, one may add the desired amount of calcium acetate which is equivalent to approximately 80% of the ethyl radical that is present in the mixture. The addition of the calcium acetate results in the formation of calcium sulfate, with the liberation of free acetic acid. However, there is present a quantity of free sulfuric or ethyl sulfuric acid. When this mixture is digested, ethyl acetate is formed and may be recovered from the mixture by distillation, after which the residual suspension of calcium sulfate is blown with steam to assure the complete removal of any free alcohol or acetic acid which may be present.

If one proceeds as above, omitting, however, the hydrolysis step by which the diethyl sulfate is converted to ethyl sulfuric acid and alcohol and part of the ethyl sulfuric acid is converted to free sulfuric acid and alcohol, the amount of ethyl acetate obtained would be negligible.

A specific embodiment of my invention is hereinafter set forth, it being understood that the invention is applicable to other salts of carboxylic acids, as well as other alkyl sulfates than those obtained by the interaction of ethylene and sulfuric acid.

4050 pounds of "dilute aqueous distillate" liquor from a previous run, the source of which is described more fully hereinafter, containing approximately 2% ethyl acetate, 3% alcohol and 1% acetic acid, the remainder being water, and 3080 pounds of water are charged into a vessel equipped with an agitator and heating coil. After the temperature has been adjusted to approximately 75° C.–80° C., 7130 pounds of crude diethyl sulfate, having an analysis approximating that indicated above, are added over a period of approximately one hour. The agitation and foregoing temperature range is maintained for three additional hours during which the hydrolysis of the diethyl sulfate is completed and a portion of the ethyl sulfuric acid is converted to ethyl alcohol and sulfuric acid. The reactions involved are as follows:

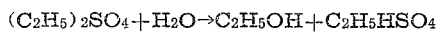

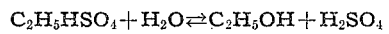

The presence of the large excess of water favors the formation of sulfuric acid in the second equation, more than 80% of the water required by the crude diethyl sulfate for complete hydrolysis being consumed in three hours.

1250 pounds of "dilute ester distillate," the origin of which will be described more fully hereinafter, containing approximately 40% ethyl acetate, 40% alcohol and 20% water, together with 5900 pounds of grey lime (80% calcium acetate) are added to the hydrolyzed mixture rapidly. Very little heating is required during the early stages of the reaction which results in the volatilization of approximately 154 pounds of crude diethyl ether. When the temperature at the top of the column reaches 60° C. the ether fraction is cut and the ester fraction is collected. The ester fraction amounts to approximately 5830 pounds which will be found to have an analysis as follows:

| | Percent |
|---|---|
| Ethyl acetate | 85 |
| Ethyl alcohol | 5.5 |
| Ether | 1 |
| Water | 8.5 |

3240 pounds of water are added gradually through the column during the ester distillation. Approximately 200 pounds of water separate from the ester fraction at the bottom of the tank containing the ester distillate which may be decanted and added to the "dilute aqueous distillate" liquor.

After the above quantity of ester has been collected, the distillation is continued without the addition of water whereby one obtains the "dilute ester distillate fraction" which has already been referred to hereinabove. This fraction is collected until the temperature at the top of the column reaches 90° C.–93° C. Thereafter a new cut is made and the distillation is then continued until approximately 3848 pounds of "dilute aqueous distillate" liquor is collected which has likewise been referred to heretofore. The residual calcium sulfate and the dilute aqueous sulfuric acid mixture in the still is then discharged and the still washed and prepared for another run.

The final acetate recovery efficiency is better than 94% and the alcohol recovery efficiency is approximately 93%–94%.

When acetic acid is employed in lieu of calcium acetate, one proceeds in a manner somewhat analogous as set forth hereinabove. For this purpose 7000 pounds of water, which may consist in part of "dilute aqueous distillate" and other fractions obtained during the manufacture of a previous batch of ethyl acetate, are heated to approximately 75° C.–80° C. after which 7130 pounds of crude diethyl sulfate, having an analysis approximating that indicated on page 2 of the specification, are added over a period of about an hour. The aforementioned temperature range is maintained for three additional hours, during which the hydrolysis of the diethyl sulfate is completed and a portion of the ethyl sulfuric acid formed is converted to ethyl alcohol and sulfuric acid.

4000 pounds of acetic acid are then introduced into the reaction vessel together with approximately 1250 pounds of dilute ester distillate. Ethyl acetate is then recovered by distillation as described in connection with the manufacture of ethyl acetate wherein calcium acetate is employed.

The sulfuric acid which remains in the still after all of the alcohol, ester and unreacted acetic acid is distilled, may be concentrated for reuse, advantageously. To this end I prefer to concentrate the acid, at ordinary or reduced pressures, to approximately 70%–72% $H_2SO_4$. In order to remove carbonaceous impurities which are formed or introduced during the manufacture of the alkyl sulfate and which are carried through the system, I have found it advantageous to subject the acid to a temperature above its normal boiling temperature for a comparatively short period of time. In general, a temperature of 175° C.–180° C. for .25 to 2.0 hours will be found sufficient to carbonize the impurities and thereby render them filterable. In the absence of the autoclaving operation and when an appreciable quantity of organic matter is present in solution, the material forms a colloidal suspension which cannot be separated from the acid by filtration or other mechanical means. Moreover, it tends to decompose the sulfuric acid when the acid is subjected to further concentration. By means of the pressure treatment the organic matter is to a large extent converted into a filterable or otherwise mechanically separable form, whereupon one may concentrate the resulting filtered acid to 90% or even higher without the excessive decomposition thereto experienced.

If desired, the amount of the ethyl radical may be supplanted by the addition of alcohol, in which case the acetic acid is increased correspondingly. For this purpose the crude diethyl sulfate mixture is hydrolyzed, as described in the foregoing examples, after which there is added 3200 pounds of 95% alcohol. 7900 pounds of acetic acid are then introduced into the reaction vessel. The mixture is permitted to esterify in the usual manner for approximately 5 hours, the temperature being maintained at or just below the boiling point. Ethyl acetate is then recovered as described heretofore and the sulphuric acid, which remains in the still after removal of the ethyl acetate, may be fortified as described above.

Alternatively, one may introduce a part of the acetic acid in the form of calcium acetate, as well as supplement the ethyl alcohol derived from the crude diethyl sulfate by additional alcohol. In practicing the invention according to this embodiment one proceeds as described in Example 1, differing only in that 3200 pounds of 95% alcohol and 4000 pounds of acetic acid are added along with the calcium acetate. The ester is recovered in the usual manner.

What I claim is:

1. In the preparation of an ester of acetic acid selected from a group consisting of the ethyl, isopropyl and butyl esters from the corresponding alkyl sulphates obtained by combining gaseous olefines with concentrated sulphuric acid under conditions whereby material amounts of dialkyl sulphates are formed and a material selected from a group consisting of the alkali forming metal salts of acetic acid and free acetic acid, the step which comprises hydrolyzing said alkyl sulphate with water whereby all of the dialkyl sulphate is reacted to form products of hydrolysis, after which the hydrolyzed mixture is esterified under conditions whereby there is at all times present a material selected from the group consisting of free sulphuric acid and alkyl hydrogen sulphate.

2. The method as defined in claim 1 and further characterized in that the products of hydrolysis of the alkyl sulfate are supplemented by additional alkyl alcohol containing the hydrocarbon nucleus corresponding to that of the alkyl sulphate.

3. A method of preparing an ester of acetic acid selected from a group consisting of ethyl acetate, isopropyl acetate and butyl acetate from the corresponding alkyl sulphates obtained by combining gaseous olefines with concentrated sulphuric acid under conditions whereby material amounts of dialkyl sulphates are formed which comprises first hydrolyzing said alkyl sulphate mixture with water under vigorously agitated conditions to form products of hydrolysis, after which the hydrolyzed mixture is esterified with acetic acid under conditions insuring at all times the presence of a material selected from the group consisting of free sulphuric acid and alkyl hydrogen sulphate.

4. The method of preparing ethyl acetate from acetic acid and a mixture of diethyl sulphate and ethyl acid sulphate obtained by combining ethylene with concentrated sulphuric acid under conditions whereby a material amount of diethyl sulphate is formed that comprises first hydrolyzing said alkyl sulphate mixture whereby all of the diethyl sulphate is converted into water soluble products of hydroylsis, and subsequently esterifying the hydrolyzed mixture with acetic acid under conditions insuring at all times the presence of a material selected from the group consisting of free sulphuric acid and ethyl hydrogen sulphate.

WILLIAM S. WILSON.